(12) United States Patent
Chen

(10) Patent No.: US 12,124,600 B1
(45) Date of Patent: Oct. 22, 2024

(54) IDENTIFICATION METHOD AND IDENTIFICATION SYSTEM AND STORAGE MEDIUM

(71) Applicant: Jun Chen, Changsha (CN)

(72) Inventor: Jun Chen, Changsha (CN)

(*) Notice: Subject to any disclaimer, the term of this patent is extended or adjusted under 35 U.S.C. 154(b) by 0 days.

(21) Appl. No.: 18/677,776

(22) Filed: May 29, 2024

(30) Foreign Application Priority Data

Nov. 4, 2023 (CN) .......................... 202311458093.8

(51) Int. Cl.
G06F 21/62 (2013.01)
G06F 21/60 (2013.01)

(52) U.S. Cl.
CPC ........ G06F 21/6218 (2013.01); G06F 21/602 (2013.01)

(58) Field of Classification Search
None
See application file for complete search history.

(56) References Cited

U.S. PATENT DOCUMENTS

2022/0103366 A1* 3/2022 Shubrook ............. H04L 63/123

FOREIGN PATENT DOCUMENTS

| CN | 113901432 A | 1/2022 |
|---|---|---|
| CN | 113904774 A | 1/2022 |
| CN | 116599676 A | 8/2023 |

* cited by examiner

*Primary Examiner* — Brandon Hoffman

(57) ABSTRACT

The present application discloses an identification method, system, storage medium. The present application reads a superordinate blockchain address and reads an identification structure and an ID structure signature message in an input device, the ID structure includes a first blockchain address and a superordinate blockchain address signature message; verifies an authorization signature via the superordinate blockchain address based on the superordinate blockchain address signature message and the first blockchain address association matter; verifies an input device signature via the first blockchain address based on the ID structure and the ID structure signature message; and operates based on the ID structure when the authorization signature is true and the input device signature is true. The present application uses dual verification techniques such as issuer and cardholder to identify the identification of the terminal, which improves the convenience of user identification.

11 Claims, 1 Drawing Sheet

---

S101 — reading a ssuperordinate blockchain address and reading an identification (ID) structure and an ID structure signature message in an input device, the ID structure includes a first blockchain address and a superordinate blockchain address signature message S102 — verifying an authorization signature via the superordinate blockchain address based on the superordinate blockchain address signature message and the first blockchain address association matter S103 — verifying an input device signature via the first blockchain address based on the ID structure and the ID structure signature message S104 — operating based on the ID structure when the authorization signature is true and the input device signature is true

IDENTIFICATION METHOD AND IDENTIFICATION SYSTEM AND STORAGE MEDIUM

CROSS-REFERENCE TO RELATED APPLICATIONS

The present application claims priority to Chinese Patent Application No. 202311458093.8, filed Nov. 4, 2023, the entire disclosure of which is incorporated herein by reference.

TECHNICAL FIELD

The present application relates to the field of Internet technology, and particularly to an identification method and an identification system.

BACKGROUND

There are various types of identification methods, such as identification cards, mobile phone SIM cards, bank cards, etc. In real life, all kinds of identification documents, subject to different issuance of authorized institutions and different anti-counterfeiting technology, each other cannot be common. In the existing technology, the bank card is issued by various commercial banking institutions, and the security check code CVV2 code technology is adopted to play the role of security and anti-counterfeiting of the bank card.

With the emergence of a large number of Internet of Things (IoT) terminals, the use of rich scenarios, the existing single identification method is inconvenient to use, and look forward to the emergence of a new type of identification technology.

SUMMARY

The inventor found that in the existing identification system, various types of documents using various types of anti-counterfeiting technology cannot be used universally, and the IoT terminal is inconvenient to use. For example, a robot in a WIFI scenario that uses a mobile phone card as identification may cause inconvenience to the user.

In order to overcome the drawbacks of the lack of universal technology to identify the identification of the terminal in the related art, and to enhance user convenience, the present application provides an identification method and an identification system, which is used to solve the above problems in the background technology.

In order to achieve the above purpose, the present application is realized by the following technical solutions: an identification method, including:
  reading a superordinate blockchain address and reading an identification (ID) structure, an ID structure signature message in an input device, the ID structure includes a first blockchain address and a superordinate blockchain address signature message, and the superordinate blockchain address signature message is a blockchain signature message generated via the superordinate blockchain address based on a first blockchain address association matter;
  the first blockchain address association matter includes the first blockchain address, the ID structure signature message is a blockchain signature message generated via the first blockchain address based on the ID structure;
  verifying an authorization signature via the superordinate blockchain address based on the superordinate blockchain address signature message and the first blockchain address association matter;
  verifying an input device signature via the first blockchain address based on the ID structure and the ID structure signature message; and
  operating based on the ID structure when the authorization signature is true and the input device signature is true.

In an embodiment, the ID structure further includes an ID structure check code, and the ID structure check code is a digital feature identification of the ID structure calculated by a one-way function, and the ID structure signature message is a blockchain signature message generated by the first blockchain address based on the ID structure check code.

In an embodiment, the one-way function includes MD5, SHA-224, SHA-256, SHA-384, SHA-512, SHA-512/224, SHA-512/256, SHA3-224, SHA3-256, SHA3-384, SHA3-512 functions.

In an embodiment, the input device is IC card, and the ID structure further includes an input device number.

In an embodiment, the input device is IC card, and the ID structure further includes an input device number, a credit limit, and an authorization effective date.

In an embodiment, the input device number is a bank card number or an IMEI number.

In an embodiment, the first blockchain address association matter further includes an input device number, a credit limit, and an authorization effective date.

In an embodiment, the reading a superordinate blockchain address includes: reading a superordinate blockchain address from the input device; and/or
  obtaining a superordinate blockchain address from a storage medium other than the input device.

In an embodiment, the verifying an authorization signature via the superordinate blockchain address based on the superordinate blockchain address signature message and the first blockchain address association matter includes:
  querying whether there is a cancellation of authorization information of the superordinate blockchain address signature message;
  when there is no the cancellation of authorization information, verifying the authorization signature via the superordinate blockchain address based on the superordinate blockchain address signature message and the first blockchain address association matter.

In an embodiment, the verifying the authorization signature via the superordinate blockchain address based on the superordinate blockchain address signature message and the first blockchain address association matter includes:
  the ID structure further includes an authorization effective date;
  when within the authorization effective date, verifying the authorization signature via the superordinate blockchain address based on the superordinate blockchain address signature message and the first blockchain address association matter.

In an embodiment, verifying the input device signature via the first blockchain address based on the ID structure and the ID structure signature message includes:
  querying whether there is a cancellation of authorization message for the ID structure signature message;
  when there is no the cancellation of authorization message, verifying the input device signature via the first blockchain address based on the ID structure and the ID structure signature message.

In an embodiment, verifying the authorization signature via the superordinate blockchain address based on the superordinate blockchain address signature message and the first blockchain address association matter includes:
  the ID structure further includes: a valid date;
  verifying an input device signature via the first blockchain address based on the ID structure and the ID structure signature message when within the effective date.

In an embodiment, the verifying the authorization signature via the superordinate blockchain address based on the superordinate blockchain address signature message and the first blockchain address association matter includes:
  verifying the input device signature via the first blockchain address based on the ID structure check code and the ID structure signature message.

In an embodiment, the operating based on the ID structure includes determining an identification number of the input device based on the ID structure.

In an embodiment, the operating based on the ID structure includes determining the identification number of the input device as the first blockchain address based on the ID structure.

In an embodiment, the operating based on the ID structure includes displaying some or all of the information of the ID structure based on the ID structure.

In an embodiment, the operating based on the ID structure includes generating a form based on the ID structure.

In an embodiment, the operating based on the ID structure includes:
  the ID structure further includes a preset account;
  reading an order amount;
  paying the order amount from the preset account.

In an embodiment, the operating based on the ID structure includes:
  the ID structure further includes a credit limit and a preset account;
  reading an order amount;
  when the order amount is less than the credit limit, paying the order amount from the preset account.

In an embodiment, the operating based on the ID structure includes:
  the ID structure further includes communication address information;
  generating a logistics order based on the communication address information.

In an embodiment, the operating based on the ID structure includes:
  the ID structure further includes communication address information and a preset account;
  generating a logistics order based on the communication address information when payment has been made from the preset account.

In an embodiment, the method before further includes the input device is an IC card, verifying a match between the IC card and a card reading device when the IC card is detected entering a card reading environment.

In another aspect, an identification method includes:
  generating a superordinate blockchain address signature message of a blockchain via a superordinate blockchain address based on a first blockchain address association matter, the first blockchain address association matter includes a first blockchain address;
  generating an ID structure, the ID structure includes the first blockchain address and the superordinate blockchain address signature message;
  generating an ID structure signature message of the blockchain based on the ID structure via the first blockchain address; and
  writing the ID structure and the ID structure signature message to an input device.

In an embodiment, the generating an ID structure signature message of a blockchain based on the ID structure via a first blockchain address includes:
  generating an ID structure check code based on the ID structure, the ID structure check code is digital feature identification of the ID structure calculated by a one-way function;
  generating an ID structure signature message of a blockchain based on the ID structure check code via the first blockchain address.

In an embodiment, the one-way function includes an MD5, SHA-224, SHA-256, SHA-384, SHA-512, SHA-512/224, SHA-512/256, SHA3-224, SHA3-256, SHA3-384, and SHA3-512 function.

In an embodiment, the input device is an IC card, the ID structure further includes an input device number.

In an embodiment, the input device is an IC card, the ID structure further includes an input device number, a credit limit, an authorization effective date.

In an embodiment, the input device number is a bank card number or an IMEI number.

In an embodiment, the first blockchain address association matter further comprises at least one of the following: input device number, a credit limit, an authorization effective date.

In an embodiment, the ID structure further includes at least one of the following: authorizing valid date, a valid date, a credit limit, a preset account, and correspondence address information.

In another aspect, an identification system, applied on an identification device, wherein the identification device includes: a reading unit, a signature verification unit and an operation unit; the reading unit is logically connected to the signature verification unit and the operation unit;
  the reading unit is configured for reading a superordinate blockchain address and reading an identification (ID) structure, an ID structure signature message in an input device, the ID structure includes a first blockchain address and a superordinate blockchain address signature message, and the superordinate blockchain address signature message is a blockchain signature message generated via the superordinate blockchain address based on a first blockchain address association matter;
  the first blockchain address association matter includes the first blockchain address, the ID structure signature message is a blockchain signature message generated via the first blockchain address based on the ID structure;
  the signature verification unit is configured for verifying an authorization signature via the superordinate blockchain address based on the superordinate blockchain address signature message, the first blockchain address association matter, and verifying an input device signature via the first blockchain address based on the ID structure and the ID structure signature message; and
  the operation unit is configured for operating based on the ID structure when the authorization signature is true and the input device signature is true.

In another aspect, an identification system is applied on an identification generation device, the identification generation device includes a generation unit, a signature verification unit; the generation unit and the signature verification unit are logically connected to each other;

the signature verification unit configured for generating an authorization signature message of a superordinate blockchain address of a blockchain via a superordinate blockchain address based on a first blockchain address association matter, the first blockchain address association matter includes a first blockchain address; and generating an ID structure signature message of the blockchain via the first blockchain address based on an ID structure; and the generation unit configured for generating the ID structure, the ID structure includes the first blockchain address and the superordinate blockchain address signature message;

writing the ID structure and the ID structure signature message to an input device.

In another aspect, a non-transitory computer-readable storage medium on which a computer program is stored, the computer program, when executed by a processor, implements any one of the above mentioned identification methods.

The present application provides an identification method and an identification system, with the following beneficial effects:

In the present application: reading a superordinate blockchain address and reading an identification structure and an ID structure signature message in an input device, the ID structure includes a first blockchain address and a superordinate blockchain address signature message; verifying an authorization signature via the superordinate blockchain address based on the superordinate blockchain address signature message and the first blockchain address association matter; verifying an input device signature via the first blockchain address based on the ID structure and the ID structure signature message; and operating based on the ID structure when the authorization signature is true and the input device signature is true. The present application uses dual verification techniques such as issuer and cardholder to identify the identification of the terminal, which improves the convenience of user identification.

DETAILED DESCRIPTION OF THE EMBODIMENTS

The present application is further described below in connection with the accompanying drawings and embodiments.

First Embodiment

Figure 1:
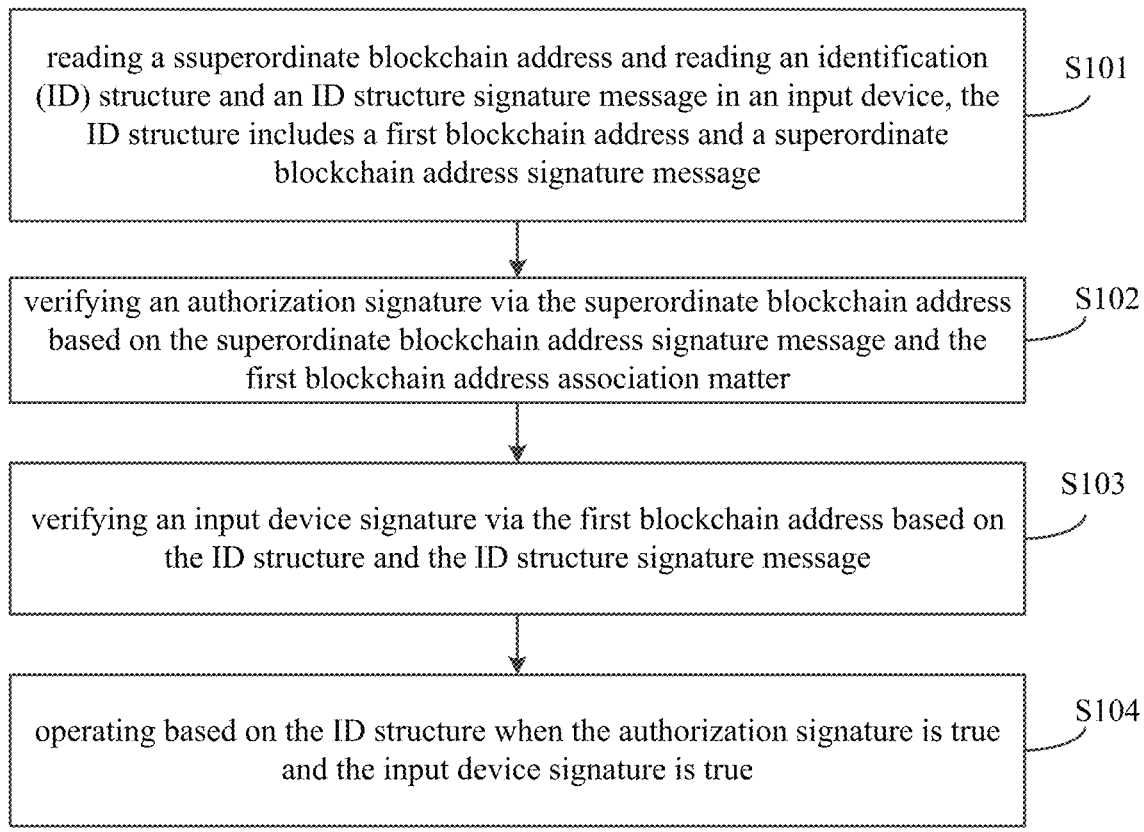
FIG. 1 is a flowchart of a first embodiment of the present application.

A first embodiment of the present application discloses an identification method, applied on an identification device, as shown in FIG. 1, the method includes:

Step S1, reading a superordinate blockchain address Parent and reading an identification (ID) structure and an ID structure signature message in an input device. The ID structure includes a first blockchain address and a superordinate blockchain address signature message, and the superordinate blockchain address signature message is a blockchain signature message Message1 generated via the superordinate blockchain address based on a first blockchain address association matter IDEvent, for example, Message1=signmessage (parent, IDEvent); the first blockchain address association matter includes the first blockchain address. As an option, the first blockchain address can be used to associate the matter with a digital signature that has been computed in one direction by the MD5 function, at this time Message1=signmessage(parent, MD5 (IDEvent)). The ID structure signature message is a blockchain signature message generated via the first blockchain address based on the ID structure. One of the blockchains can be block DAG technology, etc.

The input device can be an IC card or a digital identification document containing the above information.

Step S2, verifying an authorization signature via the superordinate blockchain address based on the superordinate blockchain address signature message and the first blockchain address association matter. The first blockchain address association matter is generally the matter for which the issuing authority has authenticated the identification of the first blockchain address.

Step S3, verifying an input device signature via the first blockchain address based on the ID structure and the ID structure signature message.

Step S4, operating based on the ID structure when the authorization signature is true and the input device signature is true, i.e. dual authentication signature of the issuing authority, the holder associated with the input device.

With this embodiment, it is possible to use the blockchain identification contained in the input device based on the authorization of the issuing authority, thereby completing the identification of the terminal or the user.

In an embodiment, the ID structure further includes an ID structure check code, and the ID structure check code is a digital feature identification of the ID structure calculated by a one-way function, and the ID structure signature message is a blockchain signature message generated by the first blockchain address based on the ID structure check code.

With this embodiment, the input device holder can configure different information according to the needs of different merchants and use the ID structure check code signature, which improves the convenience of the user to use the input device.

In an embodiment, the one-way function includes MD5, SHA-224, SHA-256, SHA-384, SHA-512, SHA-512/224, SHA-512/256, SHA3-224, SHA3-256, SHA3-384, SHA3-512 functions.

In an embodiment, the input device is IC card, and the ID structure further includes an input device number. As the blockchain address is unique, the input device can be an ID card, a bank card, a mobile phone SIM card, a credit card, a contact IC card, a contactless IC card.

In an embodiment, the input device is IC card, and the ID structure further includes an input device number, a credit limit, and an authorization effective date.

In an embodiment, the input device number is a bank card number or an IMEI number.

In an embodiment, the first blockchain address association matter further includes an input device number, a credit limit, and an authorization effective date.

In an embodiment, the reading a superordinate blockchain address includes:

reading a superordinate blockchain address from the input device; and/or obtaining a superordinate blockchain address from a storage medium other than the input device.

In this embodiment, the superordinate blockchain address can be stored in the input device, read from the configuration, or downloaded and obtained from an authoritative website, thus enhancing the general convenience of integrating identification devices in various systems In an embodiment, the verifying an authorization signature via the superordinate blockchain address based on the superordinate blockchain address signature message and the first blockchain address association matter includes:
  querying whether there is a cancellation of authorization information of the superordinate blockchain address signature message;
  when there is no the cancellation of authorization information, verifying the authorization signature via the superordinate blockchain address based on the superordinate blockchain address signature message and the first blockchain address association matter.

In an embodiment, the verifying the authorization signature via the superordinate blockchain address based on the superordinate blockchain address signature message and the first blockchain address association matter includes:
  the ID structure further includes an authorization effective date;
  when within the authorization effective date, verifying the authorization signature via the superordinate blockchain address based on the superordinate blockchain address signature message and the first blockchain address association matter. When not within the authorization effective date, the authorization signature is false.

In this embodiment, the validity of the signature authorization can be judged based on the authorization effective date and whether there is an act of cancellation of the authorization.

In an embodiment, verifying the input device signature via the first blockchain address based on the ID structure and the ID structure signature message includes:
  querying whether there is a cancellation of authorization message for the ID structure signature message;
  when there is no the cancellation of authorization message, verifying the input device signature via the first blockchain address based on the ID structure and the ID structure signature message.

In an embodiment, verifying the authorization signature via the superordinate blockchain address based on the superordinate blockchain address signature message and the first blockchain address association matter includes:
  the ID structure further includes a valid date;
  verifying an input device signature via the first blockchain address based on the ID structure and the ID structure signature message when within the effective date.

In an embodiment, the verifying the authorization signature via the superordinate blockchain address based on the superordinate blockchain address signature message and the first blockchain address association matter includes:
  verifying the input device signature via the first blockchain address based on the ID structure check code and the ID structure signature message.

In an embodiment, the operating based on the ID structure includes determining an identification number of the input device based on the ID structure. In this embodiment, the input device number may be used as an identification, the first blockchain address may be used as an identification, or other data contained in the input device that can be verified by the present application may be entered.

In an embodiment, the operating based on the ID structure includes determining the identification number of the input device as the first blockchain address (BID) based on the ID structure. By this embodiment, BID (blockchain Identify) is invented for identifying the terminal, and since the blockchain address is unique in the blockchain network, the BID is also unique.

In an embodiment, the operating based on the ID structure includes displaying some or all of the information of the ID structure based on the ID structure.

In an embodiment, the operating based on the ID structure includes generating a form based on the ID structure. The form can be a winform form, a web form, a json file, a xml file, etc.

In an embodiment, the operating based on the ID structure includes:
  the ID structure further includes a preset account;
  reading an order amount;
  paying the order amount from the preset account.

In this embodiment, the input device may be customized to be a loyalty card, a consumer card, a bank card, a credit card that supports the blockchain identification.

In an embodiment, the operating based on the ID structure includes:
  the ID structure further includes a credit limit and a preset account;
  reading an order amount;
  when the order amount is less than the credit limit, paying the order amount from the preset account.

In an embodiment, the operating based on the ID structure includes:
  the ID structure further includes communication address information;
  generating a logistics order based on the communication address information.

In this embodiment, the input device may be customized to support the blockchain identification for express logistics cards.

In an embodiment, the operating based on the ID structure includes:
  the ID structure further includes communication address information and a preset account;
  generating a logistics order based on the communication address information when payment has been made from the preset account.

In an embodiment, the method before further includes the input device is an IC card, verifying a match between the IC card and a card reading device when the IC card is detected entering a card reading environment.

Second Embodiment

The second embodiment of the present application discloses an identification method, the method includes:

Step S201, generating a superordinate blockchain address signature message of a blockchain via a superordinate blockchain address based on a first blockchain address association matter, the first blockchain address association matter includes a first blockchain address;

Step S202, generating an ID structure, the ID structure includes the first blockchain address and the superordinate blockchain address signature message;

Step S203, generating an ID structure signature message of the blockchain based on the ID structure via the first blockchain address; and Step S204, writing the ID structure and the ID structure signature message to an input device.

In an embodiment, the generating an ID structure signature message of a blockchain based on the ID structure via a first blockchain address includes:

generating an ID structure check code based on the ID structure, the ID structure check code is digital feature identification of the ID structure calculated by a one-way function;

generating an ID structure signature message of a blockchain based on the ID structure check code via the first blockchain address.

In an embodiment, the one-way function includes an MD5, SHA-224, SHA-256, SHA-384, SHA-512, SHA-512/224, SHA-512/256, SHA3-224, SHA3-256, SHA3-384, and SHA3-512 function.

In an embodiment, the input device is an IC card, the ID structure further includes an input device number.

In an embodiment, the input device is an IC card, the ID structure further includes an input device number, a credit limit, an authorization effective date.

In an embodiment, the input device number is a bank card number or an IMEI number. This embodiment invents bank cards with BIDs that replace CVV verification codes with blockchain verification. Different banks issue BID bank cards and only need to endorse their signatures through a blockchain, the blockchain can be a private chain, an alliance chain, a public chain, etc.

In an embodiment, the first blockchain address association matter further includes at least one of the following: an input device number, a credit limit, an authorization effective date.

In an embodiment, the ID structure further includes at least one of the following: an authorizing valid date, a valid date, a credit limit, a preset account, and correspondence address information.

Third Embodiment

The third embodiment of the present application discloses an identification system, applied on an identification device, the identification device includes: a reading unit, a signature verification unit and an operation unit; the reading unit is logically connected to the signature verification unit and the operation unit;

the reading unit is configured for reading a superordinate blockchain address and reading an identification (ID) structure, an ID structure signature message in an input device, the ID structure includes a first blockchain address and a superordinate blockchain address signature message, and the superordinate blockchain address signature message is a blockchain signature message generated via the superordinate blockchain address based on a first blockchain address association matter;

the first blockchain address association matter includes the first blockchain address, the ID structure signature message is a blockchain signature message generated via the first blockchain address based on the ID structure;

the signature verification unit is configured for verifying an authorization signature via the superordinate blockchain address based on the superordinate blockchain address signature message, the first blockchain address association matter, and verifying an input device signature via the first blockchain address based on the ID structure and the ID structure signature message; and the operation unit is configured for operating based on the ID structure when the authorization signature is true and the input device signature is true.

Figure 2:
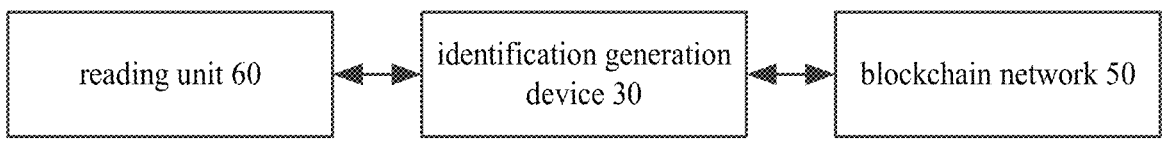
FIG. 2 is a schematic diagram of a system of a third embodiment of the present application.

An identification system includes an identification generation device 30, a reading unit 60, an identification generation device and a blockchain network 50, etc., as shown in FIG. 2. The reading device is used to read input devices or data, and is generally physically connected to the identification device by a communication line or wireless, etc., and the identification device is generally deployed in a computer. In the related art, the issuing authority of the identification card, etc. is not verified. The present embodiment enables verification in a blockchain network through the identification device. This brings convenience to the user due to the use of digital technology. A simple example of the flow of use of the present embodiment is as follows:

User A goes to the supermarket for consumption shopping, holds the IC card of the BID of this embodiment, and settles the payment at the supermarket self-service terminal, but User A does not want to carry these purchased goods because of other arrangements and wants to send them back by express delivery, the steps are as follows:

1, user A swipes down the BID card at the supermarket self-service terminal, which contains an identification recognition device, which also contains information such as a correspondence address and a preset account (bank card).

2, the identification recognition device reads the superordinate blockchain address and reads the ID structure and ID structure signature message in the input device.

3, the identification recognition device verifies the input device signature based on the ID structure, ID structure signature message via the first blockchain address.

4, the identification device verifies the authorization signature by the superordinate blockchain address based on the superordinate blockchain address signature message and the first blockchain address association matter.

5, when the authorization signature is true and the input device signature is true, performing an operation based on the ID structure, specifically including generating a logistics order based on the communication address information when payment has been made from the preset account (bank card).

Fourth Embodiment

Fourth embodiment of the present application discloses an identification system, applied on an identification generation device, the identification generation device includes a generation unit, a signature verification unit; the generation unit and the signature verification unit are logically connected to each other;

the signature verification unit configured for generating an authorization signature message of a superordinate blockchain address of a blockchain via a superordinate blockchain address based on a first blockchain address association matter, the first blockchain address association matter includes a first blockchain address; and generating an ID structure signature message of the blockchain via the first blockchain address based on an ID structure; and the generation unit configured for generating the ID structure, the ID structure includes the first blockchain address and the superordinate blockchain address signature message; writing the ID structure and the ID structure signature message to an input device.

In this embodiment, the application of the input device includes an ID structure supporting blockchain verification, which allows various types of identification technologies to be mixed, and the fusion of traditional technologies with blockchain technologies, which greatly improves the convenience of user identification.

Fifth Embodiment

Fifth embodiment of the present application discloses a non-transitory computer-readable storage medium on which a computer program is stored, the computer program, when executed by a processor, implements any one of the above mentioned identification methods. The storage medium may include a high-speed random access storage medium, and may also include a non-volatile storage medium, such as a hard drive, a memory, a plug-in hard drive, a Smart Media Card (SMC), a Secure Digital (SD) card, a Flash Card, at least one disk storage medium member, a flash memory device, or other volatile solid state storage media device, etc.

In the present application: reading a superordinate blockchain address and reading an identification structure and an ID structure signature message in an input device, the ID structure includes a first blockchain address and a superordinate blockchain address signature message; verifying an authorization signature via the superordinate blockchain address based on the superordinate blockchain address signature message and the first blockchain address association matter; verifying an input device signature via the first blockchain address based on the ID structure and the ID structure signature message; and operating based on the ID structure when the authorization signature is true and the input device signature is true. The present application uses dual verification techniques such as issuer and cardholder to identify the identification of the terminal, which improves the convenience of user identification.

The technical personnel in the field can clearly understand that, for the convenience and conciseness of the description, the above-described unit is only exemplified by the division of the above-described functional modules, and in actual application, the above-described functions can be assigned to be completed by different functional modules according to the needs, i.e., the internal structure of the device is divided into different functional modules to complete all or part of the above-described functions. The specific working process of the above-described system, device and unit can be referred to the corresponding process in the foregoing embodiment of the method, and will not be repeated herein.

In the several embodiments provided in this application, it should be understood that the systems, devices and methods disclosed, can be implemented in other ways. For example, the device embodiments described above are merely schematic, e.g., the division of the described modules or units is merely a logical functional division, and the actual implementation may be divided in other ways, e.g., multiple units or components may be combined or may be integrated into another system, or some features may be ignored, or not implemented. At another point, the coupling or direct coupling or communication connection between each other shown or discussed may be an indirect coupling or communication connection through some interface, device or unit, which may be electrical, mechanical or otherwise.

The units described as illustrated as separated components may or may not be physically separated, and the components shown as units may or may not be physical units, i.e., they may be located in one place or they may also be distributed over a plurality of network units. Some or all of these units may be selected to fulfil the purpose of the present embodiment according to actual needs.

Furthermore, the various functional units in the various embodiments of the present application may be integrated in a single processing unit, or the individual units may be physically present separately, or two or more units may be integrated in a single unit. The integrated unit may be implemented either in the form of hardware or in the form of a software functional unit.

The integrated unit may be stored in a computer readable storage medium if it is realized in the form of a software functional unit and sold or used as a separate product. Based on this understanding, the technical solution of the present application may be embodied essentially or in part as a contribution to the related art or in whole or in part in the form of a software product, which is stored in a storage medium comprising a number of instructions for causing a computer device (which may be a personal computer, a server, or a network device, etc.) or a processor to perform all or some of the steps of the method described in various embodiments of the present application. The aforementioned storage media include a USB flash drive, a mobile hard disk, a read-only memory (ROM), a random access memory (RAM), a magnetic disc or a CD-ROM, and other kinds of media that can store the program code.

The foregoing is only a specific embodiment of the present application, but the scope of the present application is not limited thereto, and those skilled in the art of the present application can easily think of changes or substitutions within the scope of the technology disclosed in the present application, all of which should be covered by the scope of the present application. Therefore, the scope of the present application shall be subject to the scope of the claims.

What is claimed is:

1. An identification method, comprising:
   reading a superordinate blockchain address and reading an identification (ID) structure and an ID structure signature message in an input device, wherein the ID structure comprises a first blockchain address and a superordinate blockchain address signature message, and the superordinate blockchain address signature message is a blockchain signature message generated via the superordinate blockchain address based on a first blockchain address association matter;
   wherein the first blockchain address association matter comprises the first blockchain address, the ID structure signature message is a blockchain signature message generated via the first blockchain address based on the ID structure;
   verifying an authorization signature via the superordinate blockchain address based on the superordinate blockchain address signature message and the first blockchain address association matter;
   verifying an input device signature via the first blockchain address based on the ID structure and the ID structure signature message; and
   operating based on the ID structure when the authorization signature is true and the input device signature is true.

2. The identification method according to claim 1, wherein the ID structure further comprises: an ID structure check code, and the ID structure check code is a digital feature identification of the ID structure calculated by a one-way function, and the ID structure signature message is a blockchain signature message generated by the first blockchain address based on the ID structure check code.

3. The identification method according to claim 1, wherein operating based on the ID structure comprises: determining an identification number of the input device based on the ID structure.

4. The identification method according to claim 1, wherein the operating based on the ID structure comprises:
the ID structure further comprises: a credit limit and a preset account;
reading an order amount;
paying the order amount from the preset account when the order amount is less than the credit limit.

5. The identification method according to claim 1, wherein the operating based on the ID structure comprises:
the ID structure further comprises: communication address information;
generating a logistics order based on the communication address information.

6. The identification method according to claim 1, wherein the operating based on the ID structure comprises:
the ID structure further comprises: a preset account;
reading an order amount;
paying the order amount from the preset account.

7. An identification method, comprising:
generating a superordinate blockchain address signature message of a blockchain via a superordinate blockchain address based on a first blockchain address association matter, wherein the first blockchain address association matter comprises a first blockchain address;
generating an ID structure, wherein the ID structure comprises the first blockchain address and the superordinate blockchain address signature message;
generating an ID structure signature message of the blockchain based on the ID structure via the first blockchain address; and when the authorization signature is true and the input device signature is true;
writing the ID structure and the ID structure signature message to an input device;
wherein the superordinate blockchain address signature message is configured to verify an authorization signature via the superordinate blockchain address based on the superordinate blockchain address signature message and the first blockchain address association matter;
the ID structure signature message is configured to verify an input device signature via the first blockchain address based on the ID structure and the ID structure signature message; and
operating based on the ID structure when the authorization signature is true and the input device signature is true.

8. The identification method according to claim 7, wherein the first blockchain address association matter further comprises at least one of the following: an input device number, a credit limit, and an authorization effective date.

9. The identification method according to claim 7, wherein the ID structure further comprises at least one of the following: an authorizing valid date, a valid date, a credit limit, a preset account, and correspondence address information.

10. An identification system, applied on an identification device, wherein the identification device comprises: a reading unit, a signature verification unit and an operation unit; the reading unit is logically connected to the signature verification unit and the operation unit;
the reading unit is configured for reading a superordinate blockchain address and reading an identification (ID) structure and an ID structure signature message in an input device, wherein the ID structure comprises a first blockchain address and a superordinate blockchain address signature message, and the superordinate blockchain address signature message is a blockchain signature message generated via the superordinate blockchain address based on a first blockchain address association matter;
wherein the first blockchain address association matter comprises the first blockchain address, the ID structure signature message is a blockchain signature message generated via the first blockchain address based on the ID structure;
the signature verification unit is configured for verifying an authorization signature via the superordinate blockchain address based on the superordinate blockchain address signature message, the first blockchain address association matter, and verifying an input device signature via the first blockchain address based on the ID structure and the ID structure signature message; and
the operation unit is configured for operating based on the ID structure when the authorization signature is true and the input device signature is true.

11. A non-transitory computer-readable storage medium, on which a computer program is stored, wherein the computer program, when executed by a processor, implements the identification method, comprising:
reading a superordinate blockchain address and reading an identification (ID) structure and an ID structure signature message in an input device, wherein the ID structure comprises a first blockchain address and a superordinate blockchain address signature message, and the superordinate blockchain address signature message is a blockchain signature message generated via the superordinate blockchain address based on a first blockchain address association matter;
wherein the first blockchain address association matter comprises the first blockchain address, the ID structure signature message is a blockchain signature message generated via the first blockchain address based on the ID structure;
verifying an authorization signature via the superordinate blockchain address based on the superordinate blockchain address signature message and the first blockchain address association matter;
verifying an input device signature via the first blockchain address based on the ID structure and the ID structure signature message; and
operating based on the ID structure when the authorization signature is true and the input device signature is true.

* * * * *